// United States Patent //

(12) United States Patent
Kaiser

(10) Patent No.: US 12,241,283 B2
(45) Date of Patent: Mar. 4, 2025

(54) BOLT LOCK

(71) Applicant: ABUS August Bremicker Söhne KG, Wetter-Volmarstein (DE)

(72) Inventor: Werner J. Kaiser, Elkenroth (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 163 days.

(21) Appl. No.: 18/158,483

(22) Filed: Jan. 24, 2023

(65) Prior Publication Data

US 2023/0243188 A1 Aug. 3, 2023

(30) Foreign Application Priority Data

Feb. 2, 2022 (DE) .......................... 102022102480.6

(51) Int. Cl.
*E05B 55/00* (2006.01)
*E05B 15/04* (2006.01)
*E05B 27/00* (2006.01)

(52) U.S. Cl.
CPC .............. *E05B 55/00* (2013.01); *E05B 15/04* (2013.01); *E05B 27/00* (2013.01); *E05B 2015/0413* (2013.01)

(58) Field of Classification Search
CPC .... E05B 15/00; E05B 15/04; E05B 2015/013; E05B 27/00; E05B 27/0003; E05B 27/0007; E05B 27/02; E05B 55/00; E05B 55/005; E05B 55/06; E05B 55/12
USPC .......................................................... 70/181
See application file for complete search history.

(56) References Cited

U.S. PATENT DOCUMENTS

| | | | | |
|---|---|---|---|---|
| 3,990,275 | A | 11/1976 | Lippisch | |
| 11,447,976 | B2 * | 9/2022 | Pankratius | .......... E05B 47/0012 |
| 2010/0319414 | A1 * | 12/2010 | Schaefer | .................. B62H 5/18 |
| | | | | 70/52 |

FOREIGN PATENT DOCUMENTS

| | | | | |
|---|---|---|---|---|
| CA | 2713573 C | * | 9/2016 | ............ E05B 67/003 |
| DE | 19706560 A1 | * | 7/1998 | ............. B62H 5/003 |
| DE | 102009039156 A1 | | 3/2011 | |
| DE | 202013103393 U1 | * | 10/2013 | ............. E05B 71/00 |
| DE | 202015100591 U1 | * | 4/2015 | ............... B62H 5/00 |
| DE | 102021114209 A1 | | 12/2022 | |
| EP | 2962919 A1 | * | 1/2016 | ............. B62H 5/147 |

(Continued)

*Primary Examiner* — Nathan Cumar
(74) *Attorney, Agent, or Firm* — Dickinson Wright PLLC

(57) ABSTRACT

A bolt lock comprises a lock body and a bolt which is lockable to the lock body. The lock body comprises a housing and a lock cylinder therein, a movable latch and a biasing spring. The housing comprises an introduction passage for the bolt. In a locking position, the latch engages a locking recess of the bolt and hereby locks the bolt. The biasing spring biases the latch in the direction of the locking position. The housing and the latch comprise a respective blocking section, wherein the blocking section of the housing and the blocking section of the latch are configured so as to engage with one another and hereby block the latch against movement from the locking position in the direction of an unlocking position, when a force, via the bolt introduced into the introduction passage, is exerted on the latch which is in the locking position, the force being counter to the introduction direction of the bolt. The biasing spring is oriented at an angle such that the biasing spring additionally biases the latch along the introduction direction of the bolt.

14 Claims, 5 Drawing Sheets

(56) References Cited

FOREIGN PATENT DOCUMENTS

| | | | |
|---|---|---|---|
| EP | 2962919 | B1 | 9/2016 |
| EP | 3064419 | B1 | 6/2018 |
| FR | 2879555 | A1 | 6/2006 |
| JP | H0619005 | Y2 | 5/1994 |

\* cited by examiner

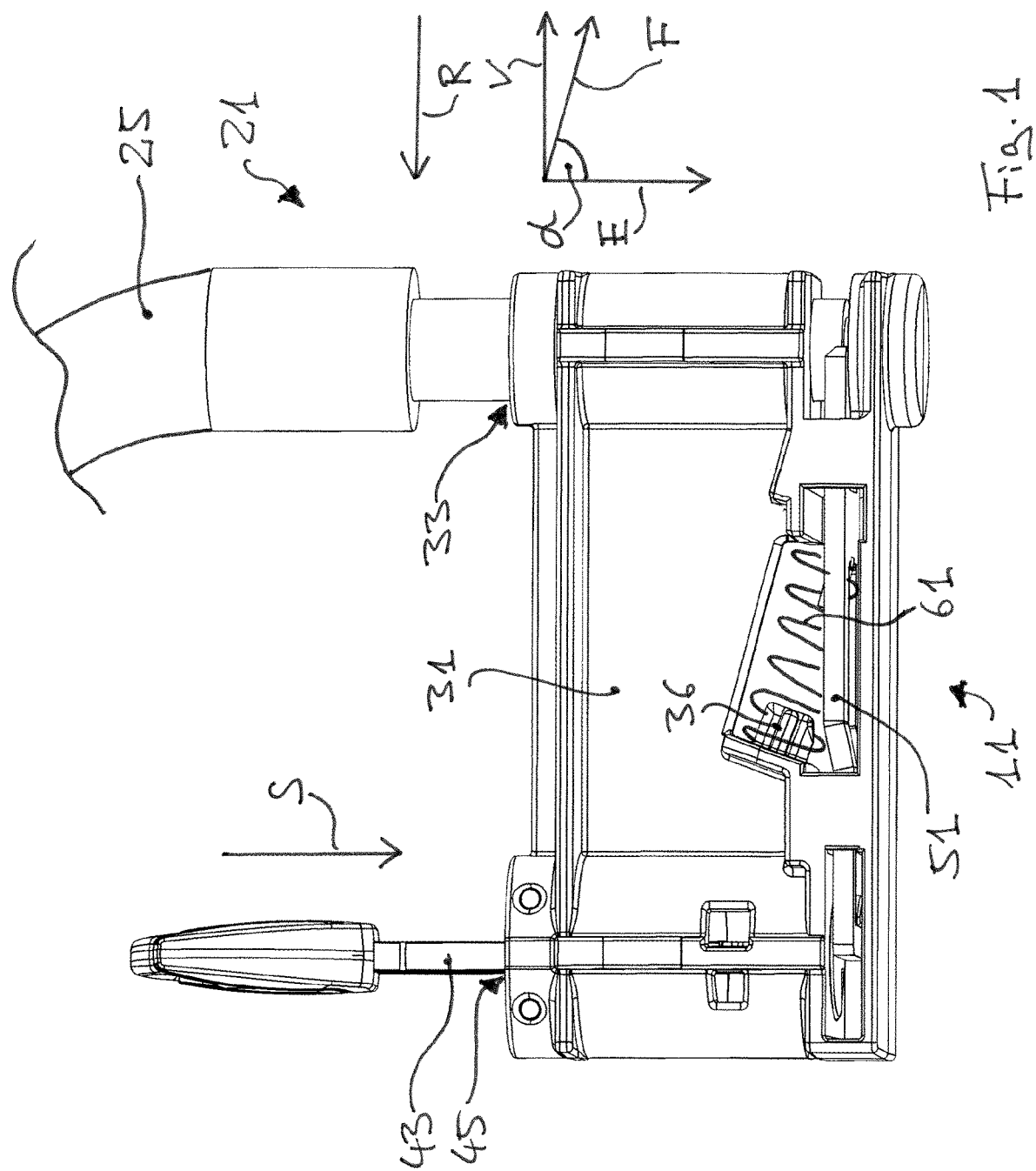

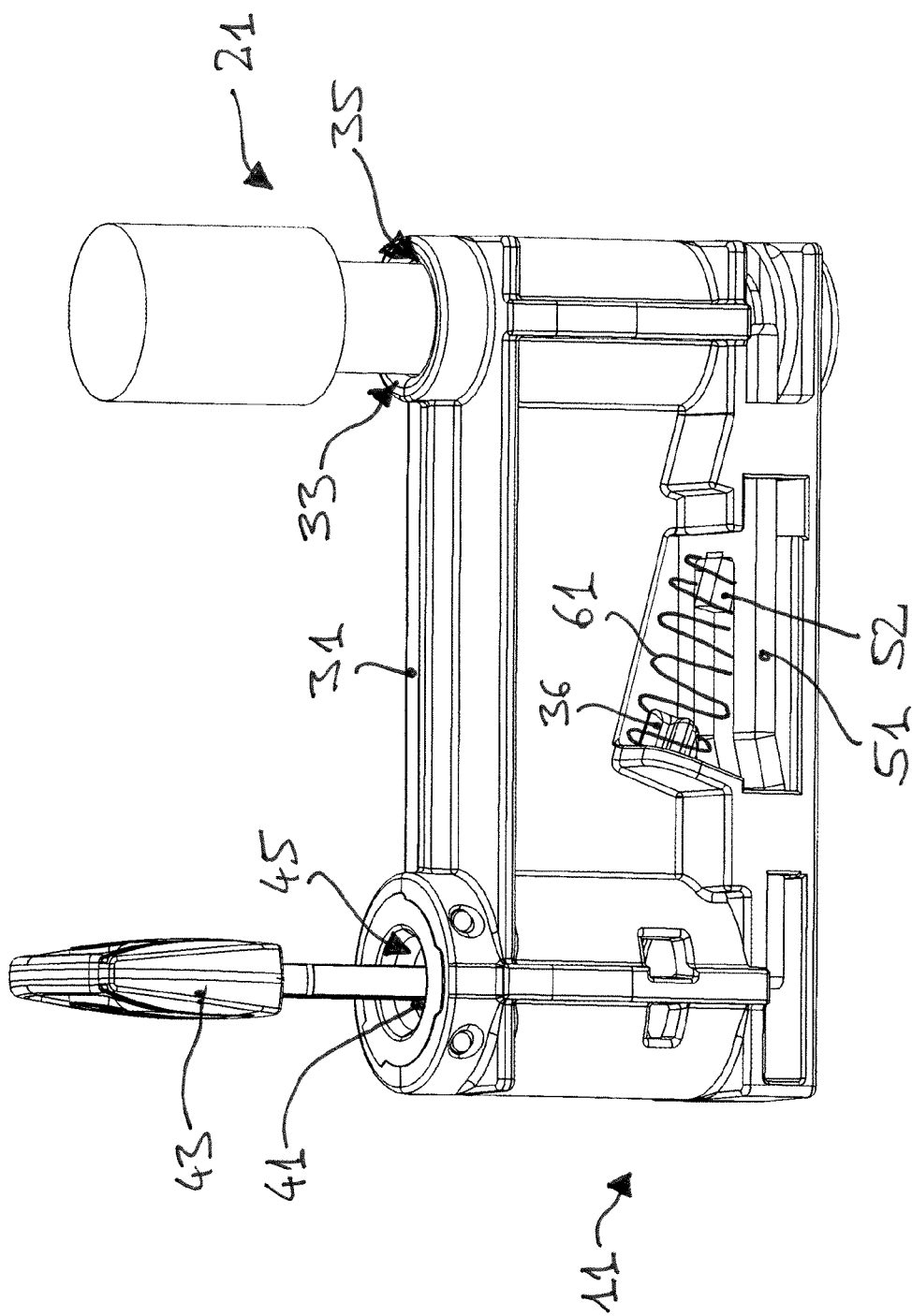

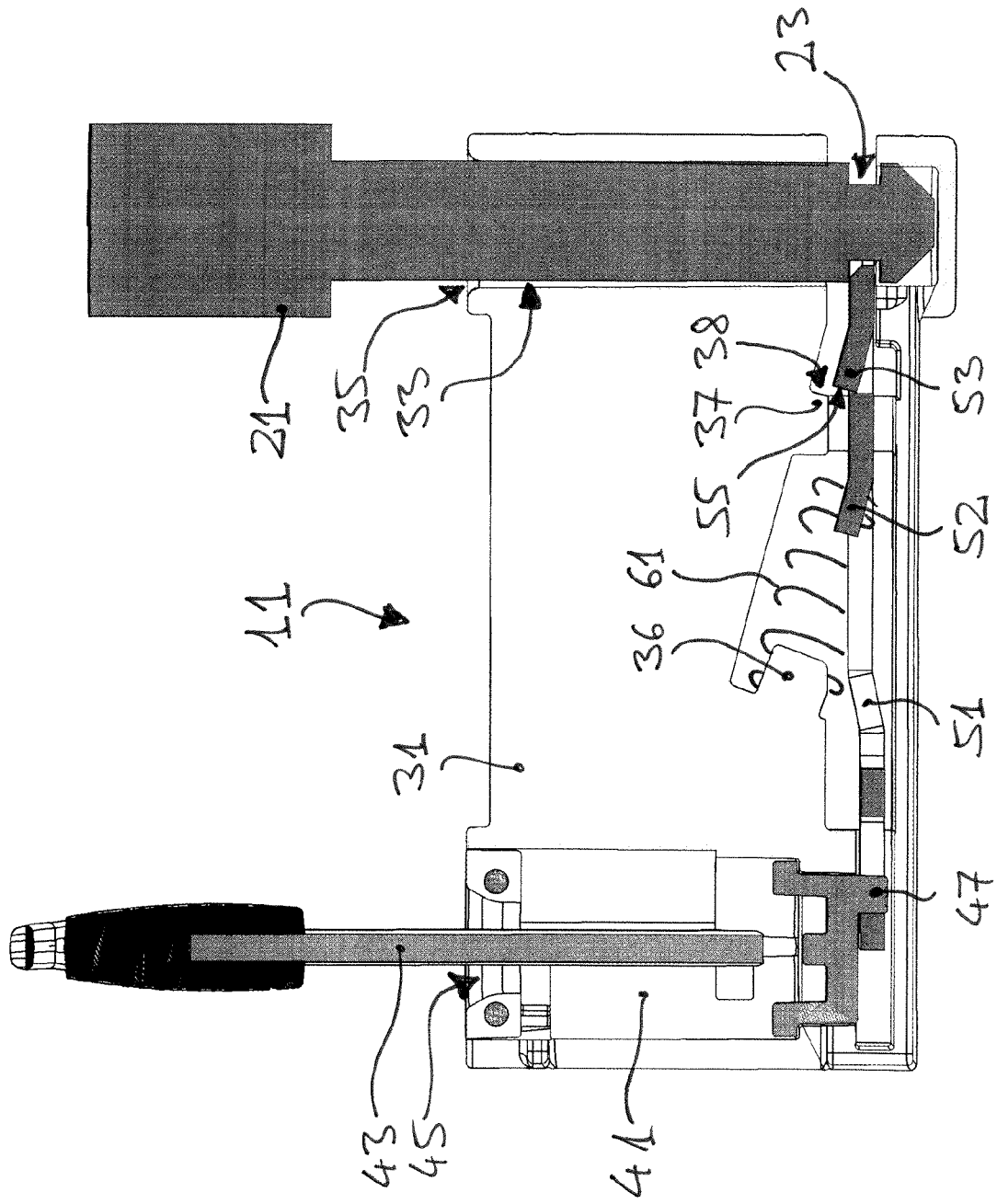

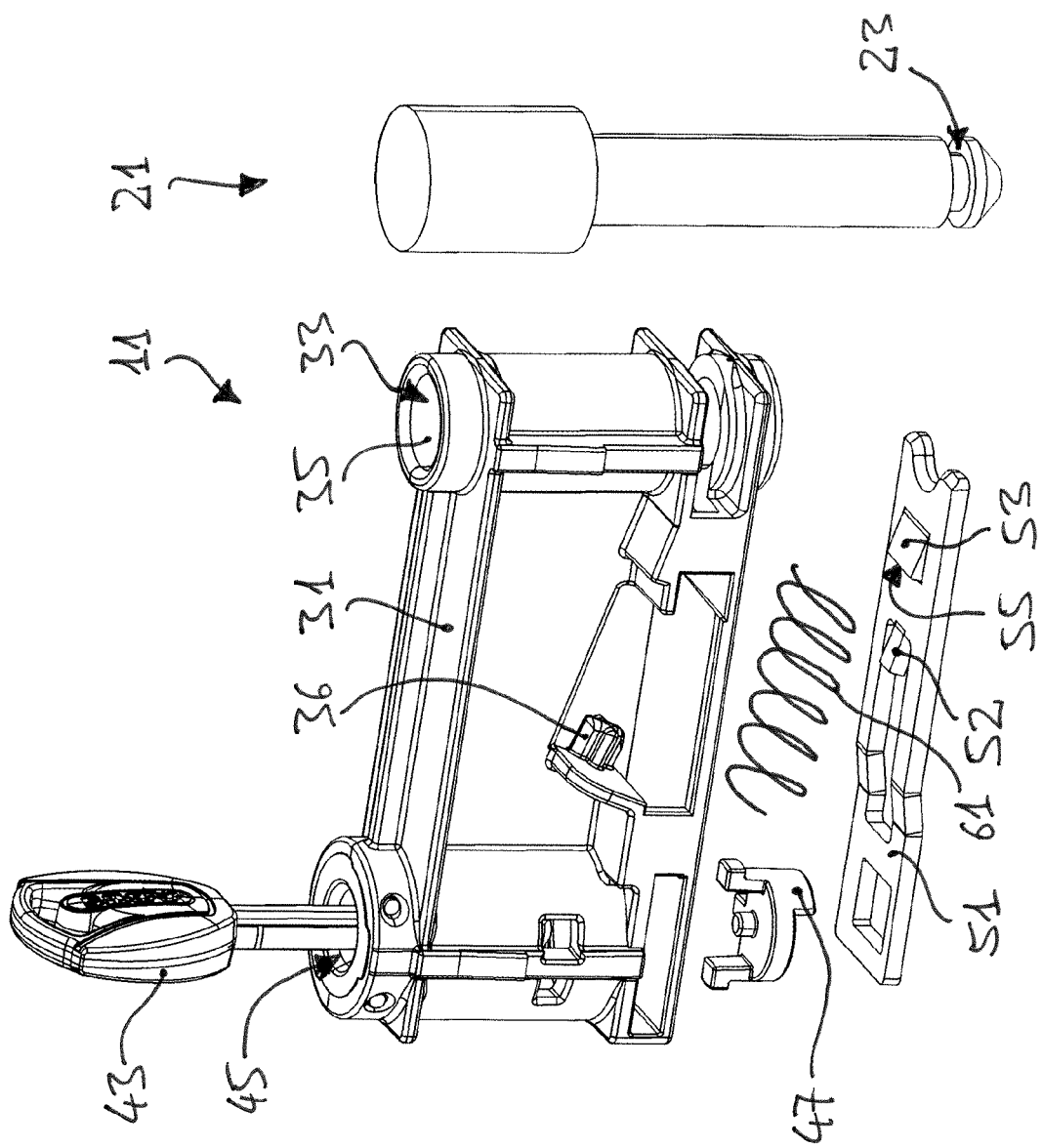

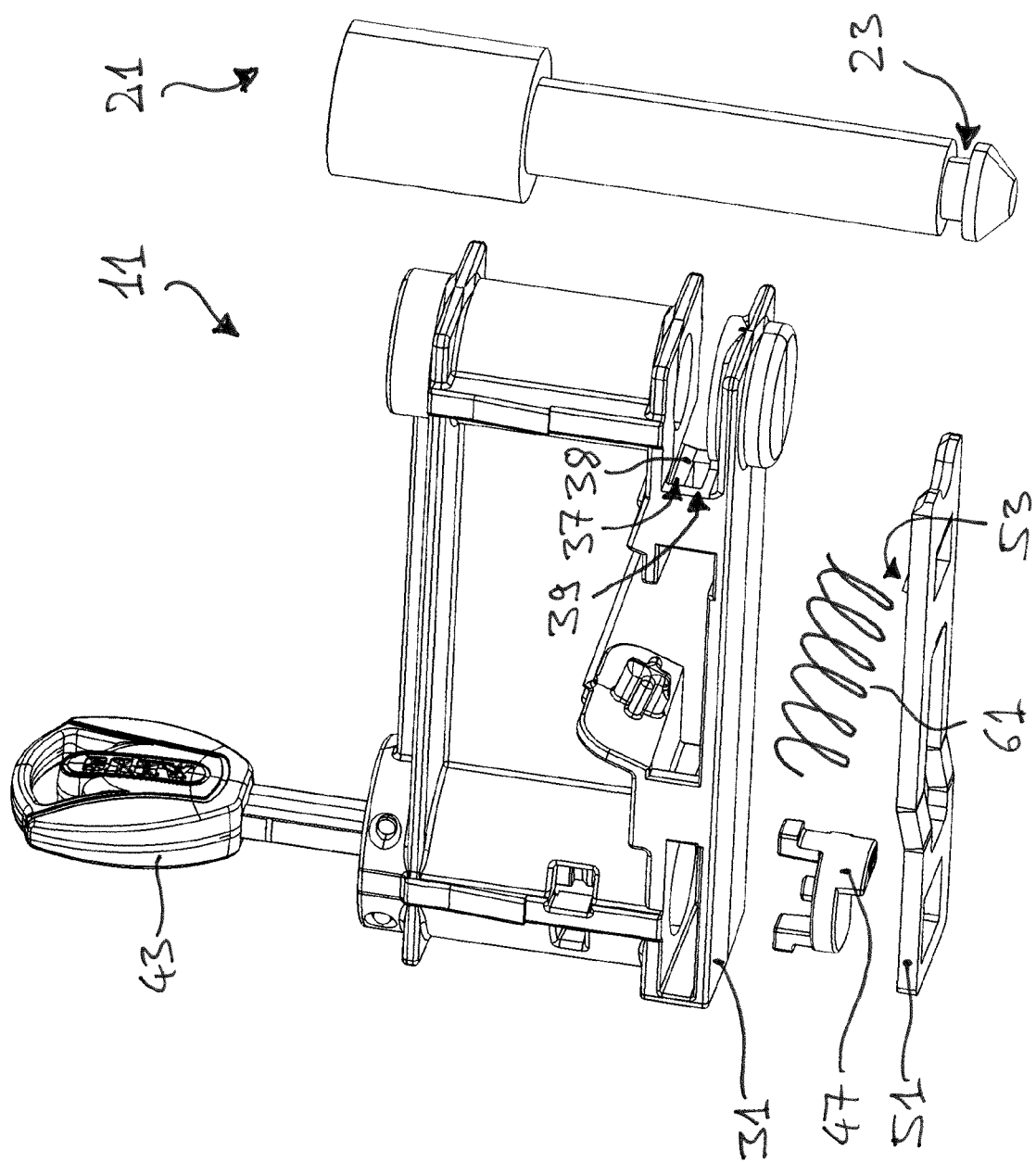

BOLT LOCK

CROSS-REFERENCE TO RELATED APPLICATION

This application claims the benefit and priority of German Patent Application No. 102022102480.6 filed on Feb. 2, 2022. The entire disclosure of the above application is incorporated herein by reference.

FIELD

The invention relates generally to a bolt lock having a lock body and a bolt that is lockable to the lock body. The lock body comprises a housing, a lock cylinder, a latch and a biasing spring. The housing accommodates the lock cylinder and comprises an introduction passage into which the bolt can be introduced along an introduction direction. The latch is biased by the biasing spring in the direction of a locking position in which the latch engages a locking recess of the bolt, thereby locking the bolt.

BACKGROUND

A bolt lock is used to selectively fix a first object and a second object to each other. For this purpose, a lock body may be permanently mounted at the first object. A bolt may be associated with the second object, wherein the bolt may be connected to, for example, a chain or a wire rope (metal cable, in particular steel cable) which is connected to or is connectable to the second object. For example, the first object may be a motor vehicle (for example, a bicycle carrier of a passenger car) or a building (for example, a wall of a building), while the second object may be a two-wheeler (for example, a bicycle or an electric bicycle) which is to be selectively secured. It is also possible, for example, that the first object is a two-wheeler (for example, a bicycle with a frame lock) that is to be selectively secured at the second object (for example, a building wall, a bicycle stand or a lamppost). From FR 2879555 A1, a chain is known which has a bolt at one end and an eyelet at the other end through which the bolt may be introduced to form a closed loop around an object.

For such a bolt lock, a manipulation attempt may consist of exerting a pulling force on the bolt against its introduction direction and by simultaneously affecting an urging of the latch against its bias in the direction of an unlocking position. Such a manipulation attempt may be counteracted namely, by a blocking geometry. However, such a blocking geometry should not prevent or impede an unlocking of the bolt lock by an authorized user.

SUMMARY OF THE INVENTION

It is therefore an object of the present invention to provide a bolt lock having improved security against manipulation, which may nevertheless be unlocked without any complications by an authorized user.

This object is achieved by the bolt lock of the invention comprising the features of claim 1.

According to an embodiment of the invention, the bolt lock comprises a lock body and a bolt which is lockable to the lock body. The lock body comprises a housing, a lock cylinder, a latch and a biasing spring. The housing accommodates the lock cylinder and has an introduction passage into which the bolt can be introduced along an introduction direction. The latch is movably supported in the housing between a locking position and an unlocking position. In the locking position, the latch engages a locking recess of the bolt and thereby locks the bolt when the bolt is introduced into the introduction passage. In the unlocking position, the latch releases the bolt for removal from the introduction passage. The biasing spring biases the latch in the direction of the locking position. The lock cylinder comprises a rotatable drive section for driving (directly or indirectly) the latch in the direction of the unlocking position. The housing and the latch comprise a respective blocking section, wherein the blocking section of the housing and the blocking section of the latch are configured to engage with one another and thereby block the latch against movement from the locking position in the direction of the unlocking position, when a force, via the bolt introduced into the introduction passage, is exerted on the latch which is in the locking position, the force being counter to the introduction direction of the bolt. The biasing spring is oriented at an angle such that the biasing spring additionally biases the latch along the introduction direction of the bolt.

The bolt lock thus has a blocking geometry that prevents or at least makes manipulative unlocking more difficult. As such, a pulling force may be exerted on the bolt which is counter to the direction of introduction and which is transmitted to the latch via the locking recess of the bolt in which the latch engages. However, the latch is moved by the movement which is counter to the introduction direction of the bolt into a position in which the blocking section of the housing and the blocking section of the latch come into contact with each other, if in addition a manipulative attempt is made to urge the latch against its bias in the direction of the unlocking position (e.g. by hitting the lock body or moving the bolt). For this purpose, the latch may be supported in the housing with a clearance (counter to the direction of introduction of the bolt) at least at an end associated with the bolt. The blocking section of the housing and the blocking section of the latch may, for example, form stops that come into contact with each other and thereby prevent (further) movement of the latch in the direction of the unlocking position.

Indeed, the bolt lock also solves the problem of any undesired difficultly for an authorized user to unlock the bolt lock. In some applications, it may be the case that a certain pulling force counter to the direction of introduction is permanently exerted on the locked bolt. For example, such a pulling force may be generated solely due to the weight of a chain connected to the bolt, as is evident from FR 2879555 A1 cited above. In other applications, it may be that an object, which has been looped around with a wire rope connected to the bolt, exerts a certain tensile stress on the wire rope and thus on the bolt (e.g. a wire rope looped around a bicycle placed on a bicycle carrier of a passenger car). If the authorized user, i.e. the owner of the key associated with the lock cylinder, attempts in such a situation to unlock the bolt by actuating the lock cylinder, the pulling force acting (unintentionally or unaware) on the bolt may trigger the explained blocking effect of the blocking section of the housing and the blocking section of the latch, so that the lock cylinder apparently does not allow correct actuation and the bolt cannot be unlocked.

In order to prevent such a supposed malfunction, the biasing spring for the latch is oriented at an angle and in such a way, that it biases the latch not only in the direction of the locking position but additionally biases it with a force component along the direction of introduction of the bolt. This ensures that the latch, when being in the locking position, is in a position along the introduction direction of the bolt in which a movement in the direction of the unlocking position is possible without the blocking section of the housing and the blocking section of the latch engaging with one another, provided that a minimum force counter to the introduction direction is not exerted on the bolt as required for the aforementioned manipulation attempt. Thus, the authorized user by means of the associated key can actuate as usual, without any complications, the lock cylinder of the bolt lock and thereby unlock the bolt for removal from the lock body. If, on the other hand, a relatively large pulling force (i.e. larger than the aforementioned force component of the obliquely orientated biasing spring) which is counter to the direction of introduction is exerted on the locked bolt so as to be able to manipulatively unlock and remove the bolt, the explained blocking geometry is activated (i.e. the blocking section of the housing and the blocking section of the bolt may come into contact with one another if the latch now also makes a movement in the direction of the unlocking position).

Further embodiments of the invention are explained in the following.

In some embodiments, the blocking section of the housing may, for example, comprise an edge. In particular, the edge may be formed by a step of the housing. The edge of the housing may, for example, define a stop surface that is oriented substantially along a normal plane to the direction of movement of the latch or obliquely, in particular slightly obliquely, to such a normal plane and serves as a stop for the blocking section of the latch.

In some embodiments, the blocking section of the housing may be arranged outside the introduction passage of the housing. Forming the blocking section of the housing to be outside the introduction passage for the bolt can simplify the manufacturing of the housing. Further, it may better prevent the build-up of dirt in the introduction passage that can enter the introduction passage through the outside opening of the introduction passage and that could interfere with the interaction of the latch with the locking recess of the bolt.

In some embodiments, the blocking section of the latch may be formed by a protrusion. The blocking section of the latch may, for example, comprise an edge. The edge of the latch may, for example, define a stop surface that may in particular be oriented parallel to the stop surface of the housing and serve as a stop for the blocking section of the housing.

The blocking section of the housing and the blocking section of the latch thus may comprise a respective stop surface which are aligned substantially parallel to one another, so as to form a form-fit for when they contact each other and reliably exert the explained blocking effect.

In some embodiments, the blocking section of the latch may be formed by a stamped and bent tongue. In this context, the term tongue can be understood to mean in particular a bent section of the latch that is exposed on three sides. This makes it possible to form the blocking section of the latch in a particularly simple and inexpensive manner, in particular if this is formed by a stamped and bent part.

In some embodiments, the latch may be constructed as a single part and may be driven directly by the drive section of the lock cylinder. Through this, the movability of the latch (movability in the longitudinal direction between the locking position and the unlocking position, as well as, required clearance along the introduction direction of the bolt) may be set particularly precisely. In other embodiments, the latch (formed as a single-part or multi-part) may be driven indirectly by the drive section of the lock cylinder, i.e. via at least one movable intermediate element.

In some embodiments, apart from the explained clearance along the introduction direction of the bolt, the latch may be supported for substantially linear (i.e., rectilinear) movement in the housing.

In some embodiments, the housing may comprise a boundary section adjacent to the introduction passage for the bolt and which surrounds the latch in a circumferentially closed manner and thereby defines a clearance of the latch along the introduction direction of the bolt. In order for the blocking section of the housing and the blocking section of the latch to come into contact with each other in the event of a manipulation attempt, as explained, a certain amount of clearance of the latch at its end associated with the bolt is required. This clearance can be defined with the required accuracy by the said boundary section of the housing, which may form a passage opening for the latch.

In some embodiments, the biasing spring for the latch or its direction of action may be oriented at an acute angle relative to the direction of introduction of the bolt. This may provide the desired force component along the direction of introduction of the bolt. For example, the angle may have a value in the range of 55 degrees to 85 degrees (for example, about 80 degrees). With respect to the direction of movement of the latch between the unlocking position and the locking position, the biasing spring for the latch may be oriented at an acute angle which, for example, may have a value in the range of 5 degrees to 45 degrees (for example, about 10 degrees).

In some embodiments, the lock cylinder may include a cylinder housing and a cylinder core rotatable within the cylinder housing. The drive section of the lock cylinder may be formed at the rotatable cylinder core and may be arranged eccentric with respect to an axis of rotation of the cylinder core.

In some embodiments, the lock cylinder may comprise a key introduction opening for an associated key, wherein the housing comprises a bolt introduction opening of the bolt introduction passage, and wherein the key introduction opening and the bolt introduction opening face in the same direction. Thus, in such embodiments, the key introduction opening and the bolt introduction opening are accessible from the same direction (e.g. frontal). This may facilitate operation of the bolt lock (actuation of the lock cylinder and introduction of the bolt), particularly when the lock body is fixedly mounted at an access surface (e.g. bicycle carrier, building wall).

In some embodiments, a key passage of the lock cylinder and the introduction passage for the bolt may be aligned at least substantially parallel to each other.

In some embodiments, the introduction direction of the bolt and a key introduction direction of the lock cylinder may extend at least substantially parallel to each other, wherein the direction of movement of the latch extends at least substantially perpendicular thereto.

In some embodiments, the bolt may be formed substantially cylindrical (i.e. rotationally-symmetrical pin-like), wherein the locking recess may be formed circumferential (i.e. as an annular groove).

In some embodiments, the bolt may be permanently connected to a cable or a chain so as to be able to secure an object relative to the lock body by means of the bolt.

DRAWINGS

The invention is explained below by way of example only, with reference to the drawings.

FIG. 1 shows a side view of parts of a bolt lock.

FIG. 2 shows a perspective view thereof.
FIG. 3 shows a sectional view thereof.
FIG. 4 shows an exploded view of parts of the bolt lock.
FIG. 5 shows a further exploded view.

DETAILED DESCRIPTION

The bolt lock shown in FIG. 1 includes a lock body 11 and a bolt 21 which is lockable to the lock body. The lock body 11 comprises a housing 31, a lock cylinder 41, a latch 51 and a biasing spring 61 (formed by a coil spring). The housing 31 may, for example, be made of die-cast zinc and may be surrounded by an outer housing (not shown).

The housing 31 may comprise fastening means for securing the lock body 11 at an installation environment (e.g. building wall, bicycle carrier of a passenger vehicle) (not shown). The lock cylinder 41 is accommodated in the housing 31 and may be rotationally actuated by means of an associated key 43, which may be inserted into the lock cylinder 41 at a key introduction opening 45 along a key introduction direction S. By rotating the inserted key 43, an eccentric drive section 47 arranged at the end of the lock cylinder 41 facing away from the key introduction opening 45, may be selectively rotated.

The housing 31 comprises an introduction passage 33 into which the bolt 21 may be introduced along an introduction direction E through a bolt introduction opening 35. The key introduction opening 45 for the key 43 and the bolt introduction opening 35 for the bolt 21 face in the same direction. The introduction direction E of the bolt 21 and the key introduction direction S of the lock cylinder 41 extend parallel to each other (see FIG. 1).

The bolt 21 has a substantially cylindrical shape with a circumferential locking recess 23 in the shape of an annular groove (cf. FIGS. 3 to 5). For example, a wire rope 25 (as indicated in FIG. 1) or a chain may be attached to the bolt 21.

The latch 51 is a single-part formed by a stamped-bent part and is supported in the housing 31 for movement between a locking position (as shown in FIG. 1) and an unlocking position. The latch 51 may be driven by the drive section 47 of the lock cylinder 41 which engages the latch 51, in a substantially straight line along an unlocking direction R which runs opposite to a locking direction V (cf. FIG. 1). The unlocking direction R and the locking direction V run perpendicular to the introduction direction E of the bolt 21 and the key introduction direction S of the lock cylinder 41. The biasing spring 61 is mounted between the housing 31 (hook-in pin 36) and the latch 51 (stamped and bent hook-in tongue 52) and biases the latch 51 along a biasing direction F in the locking position.

As regards the locking function of the bolt lock shown, in the locking position according to FIG. 1, the latch 51 engages the locking recess 23 of the bolt 21 according to the force exerted by the biasing spring 61 and thereby locks the bolt 21 at the lock body 11 when the bolt 21 is introduced into the introduction passage 33. By this, an object (e.g. a bicycle) around which the wire rope 25 is looped can be secured to the lock body 11. Through the said rotational actuation of the key 43 and via the rotatable drive section 47 of the lock cylinder 41, the latch 51 may be retracted against its bias into the unlocking position so that the latch 51 releases the bolt 21 for removal from the introduction passage 33.

The housing 31 comprises a blocking section 37. The blocking section 37 comprises a stop surface 38 and an edge bound by the stop surface 38 which is formed by a step or a recess. The blocking section 37 of the housing 31 is arranged outside of the introduction passage 33 for the bolt 21. The latch 51 also comprises a blocking section 53 formed by a protrusion in the form of a stamped and bent tongue. The blocking section 53 of the latch 51 comprises a stop surface 55 oriented substantially parallel to the stop surface 38 of the housing 31. The blocking section 37 of the housing 31 and the blocking section 53 of the latch 51 are configured to come into contact with one another and thereby block the latch 51 against movement out of the locking position along the unlocking direction R when by way of a manipulation attempt via the bolt 21 introduced into the introduction passage 33, a force is exerted on the latch 51 counter to the introduction direction E of the bolt 21 and additionally an attempt is made to move the latch 51 along the unlocking direction R. Due to such a force exertion, the latch 51 is moved, namely counter to the introduction direction E of the bolt 21, into a position (upwards in FIGS. 1 to 5) in which the blocking section 37 of the housing 31 and the blocking section 53 of the latch 51 reach the same height and may thus engage with each other along the unlocking direction R. For this purpose, the latch 51 has a certain clearance in the housing 31 at its end facing the bolt 21, which clearance is determined by the clearing height of a boundary section 39 of the housing 31 through which the latch 51 protrudes (cf. FIG. 5).

However, in order that this blocking mechanism does not hinder the intended unlocking by the authorized user, i.e. by rotational actuation of the lock cylinder 41 by means of the associated key 43, the biasing spring 61 is oriented obliquely in such a way that the biasing spring 61 biases the latch 51 not only along the locking direction V, but additionally along the introduction direction E of the bolt. For this purpose, the biasing direction F of the biasing spring 61 extends at an acute angle α to the introduction direction E of the bolt 21 (cf. FIG. 1). The force component exerted by the biasing spring 61 that runs along the introduction direction E is thus smaller than the force component that extends along the locking direction V. The angle α may have, for example, a value in the range of 55 degrees to 85 degrees (for example, about 80 degrees).

The oblique orientation of the biasing spring 61 ensures that the latch 51, when being in the locking position and provided that a minimum force counter to the introduction direction E is not exerted on the bolt 21 as is required for the aforementioned manipulation attempt, is in a position along the introduction direction E of the bolt 21 in which movement in the unlocking direction R is possible without the blocking section 37 of the housing 31 and the blocking section 53 of the latch 51 unintentionally engaging with each other. Thus, the authorized user, by means of the associated key 43, may actuate the lock cylinder 41 of the bolt lock as normal without complication, and thereby unlock the bolt 21 for removal from the lock body 11.

While an exemplary embodiment has been described in the foregoing, various alterations are possible without departing from the spirit of the invention. For example, instead of a purely mechanical lock cylinder any type of latch actuator may be used for driving the latch, e.g. an electric motor or a solenoid. Also, the biasing spring does not need to be a coil spring but may instead comprise an elastic element of any shape, e.g. a long-arm spring or a torsion spring.

What is claimed is:
1. A bolt lock having a lock body and a bolt that is lockable to the lock body, wherein the lock body comprises a housing, a lock cylinder, a latch and a biasing spring, wherein the housing accommodates the lock cylinder and comprises an introduction passage into which the bolt can be introduced along an introduction direction, wherein the latch is movably supported in the housing between a locking position and an unlocking position, wherein in the locking position, the latch engages in a locking recess of the bolt and hereby locks the bolt when the bolt is introduced into the introduction passage, and wherein in the unlocking position, the latch releases the bolt for removal from the introduction passage, wherein the biasing spring biases the latch in a direction of the locking position, wherein the lock cylinder comprises a rotatable drive section for driving the latch in a direction of the unlocking position, wherein the housing comprises a blocking section and the latch comprises a blocking section, wherein the blocking section of the housing and the blocking section of the latch are configured to come into contact with one another and thereby block the latch against movement out of the locking position in the direction of the unlocking position, when a force, via the bolt introduced into the introduction passage, is exerted on the latch which is in the locking position, the force being counter to the introduction direction of the bolt, and wherein the biasing spring is oriented obliquely such that the biasing spring additionally biases the latch along the introduction direction of the bolt.

2. The bolt lock according to claim 1, wherein the blocking section of the housing comprises a stop surface, and wherein the blocking section of the latch comprises a stop surface which is oriented substantially parallel to the stop surface of the housing.

3. The bolt lock according to claim 1, wherein the blocking section of the housing comprises an edge.

4. The bolt lock according to claim 1, wherein the blocking section of the housing is arranged outside of the introduction passage of the housing.

5. The bolt lock according to claim 1, wherein the blocking section of the latch is formed by a protrusion.

6. The bolt lock according to claim 1, wherein the blocking section of the latch is formed by a stamped and bent tongue.

7. The bolt lock according to claim 1, wherein the latch is formed as a single-part and is directly driven by the drive section of the lock cylinder.

8. The bolt lock according to claim 1, wherein the housing adjacent to the introduction passage for the bolt comprises a boundary section which surrounds the latch in a circumferentially closed manner and hereby determines a clearance of the latch along the introduction direction of the bolt.

9. The bolt lock according to claim 1, wherein the biasing spring is oriented at an acute angle (a) relative to the introduction direction of the bolt.

10. The bolt lock according to claim 1, wherein the lock cylinder comprises a key introduction opening for a key, wherein the housing comprises a bolt introduction opening of the introduction passage for the bolt, and wherein the key introduction opening and the bolt introduction opening face in the same direction.

11. The bolt lock according to claim 1, wherein the introduction direction of the bolt and a key introduction direction of the lock cylinder extend substantially parallel to one another, and wherein the direction of movement of the latch extends substantially perpendicular to thereto.

12. The bolt lock according to claim 1, wherein the bolt is cylindrical, and wherein the locking recess is formed circumferentially.

13. The bolt lock according to claim 1, wherein the bolt is connected to a cable or a chain.

14. A bolt lock having a lock body and a bolt that is lockable to the lock body, wherein the lock body comprises a housing, a latch actuator, a latch and a biasing spring, wherein the housing comprises an introduction passage into which the bolt can be introduced along an introduction direction, wherein the latch is movably supported in the housing between a locking position and an unlocking position, wherein in the locking position, the latch engages into a locking recess of the bolt and hereby locks the bolt when the bolt is introduced into the introduction passage, and wherein in the unlocking position, the latch releases the bolt for removal from the introduction passage, wherein the biasing spring biases the latch in a direction of the locking position, wherein the latch actuator is configured to move the latch in a direction of the unlocking position, wherein the housing comprises a blocking section and the latch comprises a blocking section, wherein the blocking section of the housing and the blocking section of the latch form an abutment which blocks the latch against movement out of the locking position in the direction of the unlocking position, when a force, via the bolt introduced into the introduction passage, is exerted on the latch in a direction counter to the introduction direction of the bolt, and wherein the biasing spring is configured to exert a force component on the latch which additionally biases the latch along the introduction direction of the bolt.

* * * * *